(12) United States Patent
Senoue

(10) Patent No.: US 11,450,890 B2
(45) Date of Patent: Sep. 20, 2022

(54) SECONDARY BATTERY INCLUDING FIRST ELECTRODE WITH PENETRATING THROUGH HOLES, FIRST SEPARATOR LAYER ON INNER WALLS OF THROUGH HOLES, AND SECOND SEPARATOR LAYER ON OPPOSING FACES ON FIRST ELECTRODE AND METHOD OF PRODUCING THE SAME

(71) Applicant: TOYOTA JIDOSHA KABUSHIKI KAISHA, Toyota (JP)

(72) Inventor: Masaharu Senoue, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/749,470

(22) Filed: Jan. 22, 2020

(65) Prior Publication Data
US 2020/0243897 A1    Jul. 30, 2020

(30) Foreign Application Priority Data

Jan. 30, 2019 (JP) .............................. JP2019-014467

(51) Int. Cl.
*H01M 10/058* (2010.01)
*H01M 10/0525* (2010.01)
(Continued)

(52) U.S. Cl.
CPC ........... *H01M 10/058* (2013.01); *H01M 4/13* (2013.01); *H01M 10/0525* (2013.01);
(Continued)

(58) Field of Classification Search
CPC .. H01M 10/058; H01M 10/0525; H01M 4/13; H01M 50/449
(Continued)

(56) References Cited

U.S. PATENT DOCUMENTS

| 8,865,345 B1 | 10/2014 | Ramasubramanian et al. |
| 2009/0052110 A1* | 2/2009 | Masuda ................ H01G 4/005 361/303 |

(Continued)

FOREIGN PATENT DOCUMENTS

| JP | 2001-126736 A | 5/2001 |
| JP | 5511604 B2 | 6/2014 |

*Primary Examiner* — Sean P Cullen
(74) *Attorney, Agent, or Firm* — Sughrue Mion, PLLC

(57) ABSTRACT

A secondary battery made by laminating a separator layer and a second electrode to insides of a plurality of through holes of a first electrode, the first electrode having one face, an opposite face, a side face, and the through holes that penetrate from the one face to the opposite face, makes it possible to stably collect currents for the second electrode, and gives good cycle characteristics as a secondary battery. The secondary battery includes: the first electrode having the one face, the opposite face, the side face, and a plurality of the through holes that penetrate from the one face to the opposite face; a first separator layer that is laminated to inner walls of the through holes of the first electrode; a second separator layer that is laminated to at least one of the one face and the opposite face of the first electrode; and the second electrode that is laminated to surfaces of the first separator layer and the second separator layer, the surfaces being on the opposite side of other surfaces thereof which are in contact with the first electrode, the second electrode being continuously present across the surfaces, wherein conductivity of a carrier ion of the second separator layer is lower than that of the first separator layer.

8 Claims, 10 Drawing Sheets

(51) Int. Cl.
*H01M 4/13* (2010.01)
*H01M 50/449* (2021.01)
*H01M 4/02* (2006.01)

(52) U.S. Cl.
CPC .... *H01M 50/449* (2021.01); *H01M 2004/021* (2013.01); *H01M 2300/002* (2013.01)

(58) Field of Classification Search
USPC .................................. 429/94, 144, 251, 254
See application file for complete search history.

(56) References Cited

U.S. PATENT DOCUMENTS

| | | | |
|---|---|---|---|
| 2011/0310530 A1* | 12/2011 | Laor | H05K 1/162 |
| | | | 361/524 |
| 2012/0070734 A1 | 3/2012 | Uetani et al. | |
| 2013/0149613 A1* | 6/2013 | Yoshikawa | H01G 11/52 |
| | | | 429/247 |
| 2014/0038025 A1* | 2/2014 | Ha | H01M 50/411 |
| | | | 429/144 |
| 2014/0335395 A1* | 11/2014 | Ramasubramanian | ...................... |
| | | | H01M 10/058 |
| | | | 429/142 |

* cited by examiner

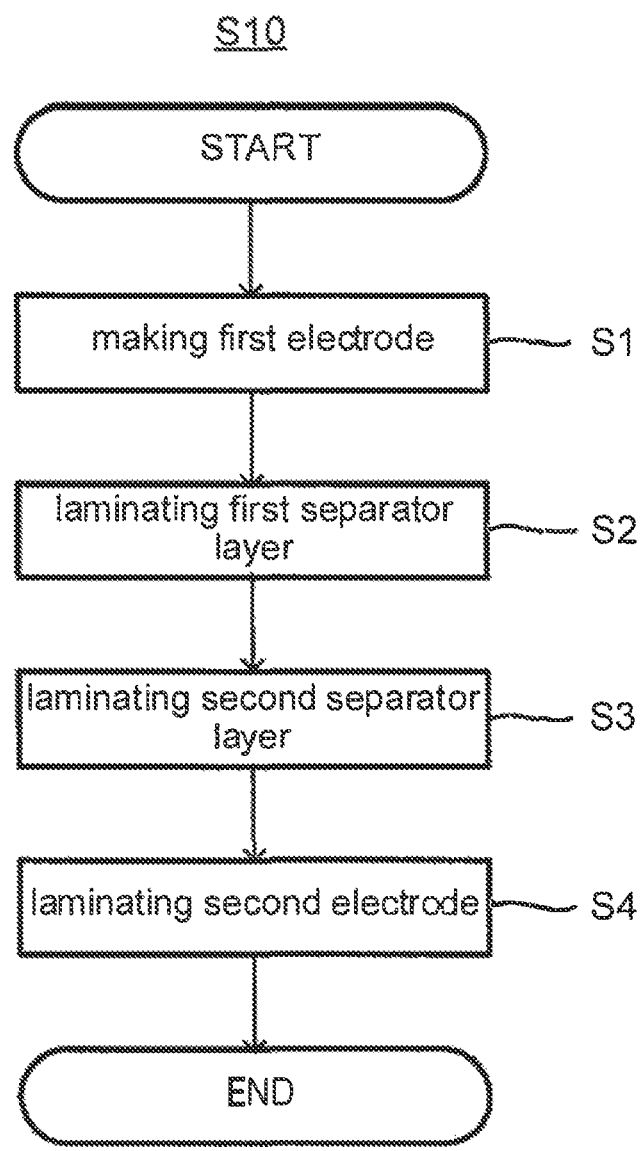

SECONDARY BATTERY INCLUDING FIRST ELECTRODE WITH PENETRATING THROUGH HOLES, FIRST SEPARATOR LAYER ON INNER WALLS OF THROUGH HOLES, AND SECOND SEPARATOR LAYER ON OPPOSING FACES ON FIRST ELECTRODE AND METHOD OF PRODUCING THE SAME

FIELD

The present application discloses a secondary battery and a method of producing the secondary battery, etc.

BACKGROUND

It is known that some secondary battery uses an electrode having one face, an opposite face, a side face, and a plurality of through holes that penetrate from the one face to the opposite face. For example, JP 2001-126736 A discloses that a partition surface of a cell including an outer surface of a carbonaceous honeycomb structure is coated with a titanium nitride film, to obtain a honeycomb-structure collector for an electrode of a lithium ion secondary battery. JP 5511604 B2 also discloses an anode active material layer having a honeycomb-shaped network structure, as a structure similar to JP 2001-126736 A in appearance.

SUMMARY

Technical Problem

The inventor of the present application made a secondary battery by laminating a separator layer and a second electrode to inner walls of a plurality of through holes of a first electrode: the first electrode has one face, an opposite face, a side face, and the through holes that penetrate from the one face to the opposite face (FIG. 9A). It is believed that to employ this structure makes it possible to reduce the volume of current collectors, makes the distance between electrodes shorter, makes it possible to simplify the structure of current collection, etc., which may give a secondary battery high capacity and good input-output characteristics. When such a structure is employed for a secondary battery, currents can be collected for the second electrode on the side(s) of (a) face(s) where the through holes are open, that is, on the side(s) of the one face and/or the opposite face of the first electrode. In this case, one may provide a separator layer not only for the insides of the through holes but also on the side(s) of the face(s) where the through holes are open, to continuously provide the second electrode for the surface of the separator layer across the insides of the through holes and the side(s) of the face(s) where the through holes are open as shown in FIG. 9B for stable current collection. In contrast, according to new findings of the inventor of the present application, to employ the structure shown in FIG. 9B causes a new problem of probable deterioration of cycle characteristics as a secondary battery.

Solution to Problem

As one means for solving the problem, the present application discloses a secondary battery including: a first electrode having one face, an opposite face, a side face, and a plurality of through holes that penetrate from the one face to the opposite face; a first separator layer that is laminated to inner walls of the through holes of the first electrode; a second separator layer that is laminated to at least one of the one face and the opposite face of the first electrode; and a second electrode that is laminated to surfaces of the first separator layer and the second separator layer, the surfaces being on an opposite side of other surfaces thereof which are in contact with the first electrode, the second electrode being continuously present across the surfaces, wherein conductivity of a carrier ion of the second separator layer is lower than conductivity of a carrier ion of the first separator layer.

In the secondary battery of the present disclosure, the first separator layer may contain a fine particle, and a binder to bind the fine particles.

In the secondary battery of the present disclosure, the second separator layer may contain at least one selected from a polyimide, a polyamide-imide, and polyacrylic acid.

The secondary battery of the present disclosure may further include: a first current collector that is provided for the side face of the first electrode; and a second current collector that is provided for a surface of the second electrode present on a side of the one face or the opposite face of the first electrode.

The secondary battery of the present disclosure may further include: an electrolyte solution containing a carrier ion.

In the secondary battery of the present disclosure, the carrier ion may be a lithium ion.

As one means for solving the problem, the present application discloses a method of producing a secondary battery, the method including: a first step of making a first electrode having one face, an opposite face, a side face, and a plurality of through holes that penetrate from the one face to the opposite face; a second step of laminating a first separator layer to inner walls of the through holes of the first electrode; a third step of laminating a second separator layer to at least one of the one face and the opposite face of the first electrode; and a fourth step of continuously laminating a second electrode to surfaces of the first separator layer and the second separator layer across the surfaces, the surfaces being on an opposite side of other surfaces thereof which are in contact with the first electrode, wherein in the third step, conductivity of a carrier ion of the second separator layer is lower than conductivity of a carrier ion of the first separator layer.

In the production method of the present disclosure, in the third step, a material to constitute the second separator layer may be electro-deposited over, or transferred to at least one of the one face and the opposite face of the first electrode.

Advantageous Effects

According to the secondary battery of the present disclosure, the capacity of the first electrode is easy to balance that of the second electrode, and cycle characteristics in charge and discharge is superior.

BRIEF DESCRIPTION OF DRAWINGS

FIGS. 3A to 3C are explanatory schematic views of structure of a first separator layer 20a;

FIG. 8 is an explanatory flowchart of a method of producing a secondary battery S10;

DESCRIPTION OF EMBODIMENTS

1. Secondary Battery 100

Figure 1A:
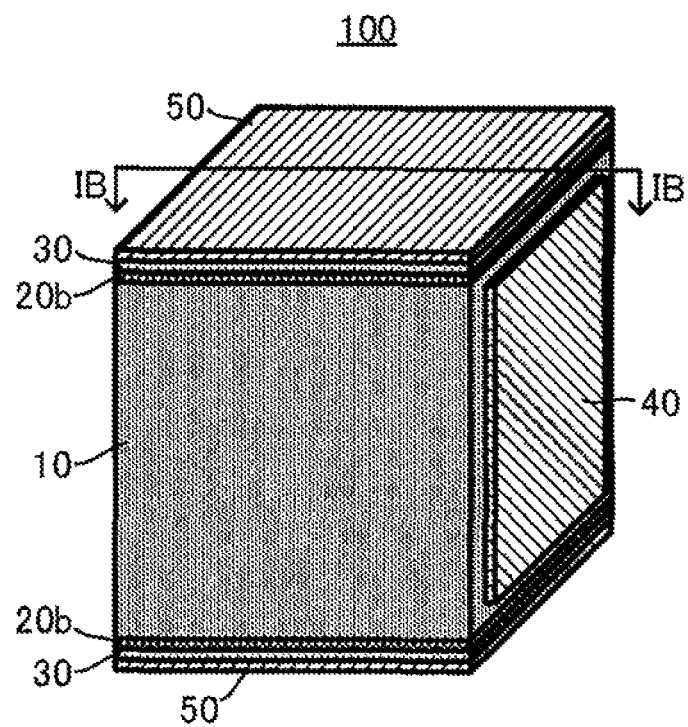
FIGS. 1A and 1B are explanatory schematic views of structure of a secondary battery 100.
Figure 1B:
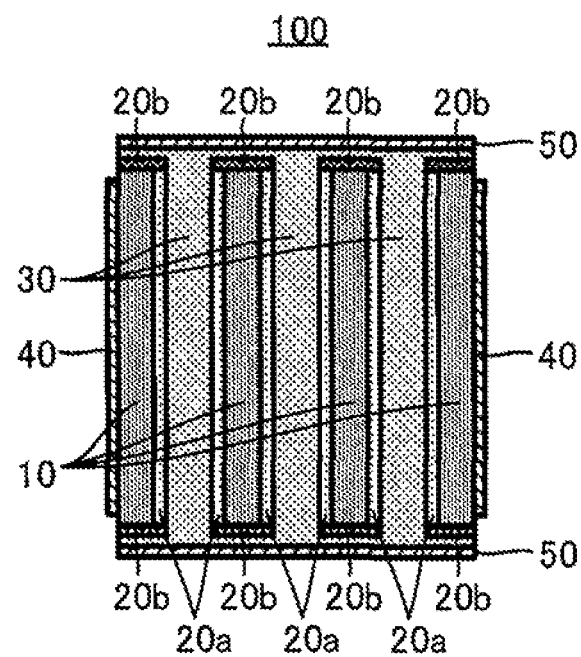
Figure 2A:
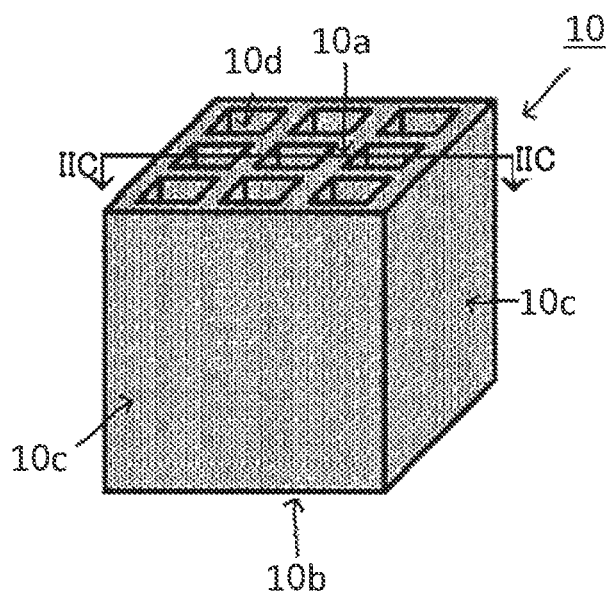
FIGS. 2A to 2C are explanatory schematic views of structure of a first electrode 10.
Figure 2B:
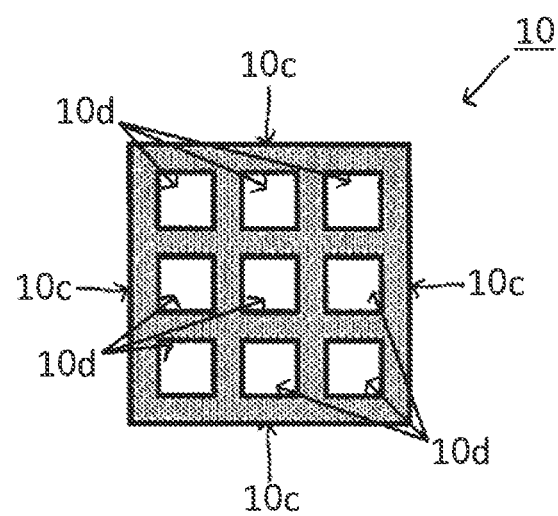
Figure 2C:
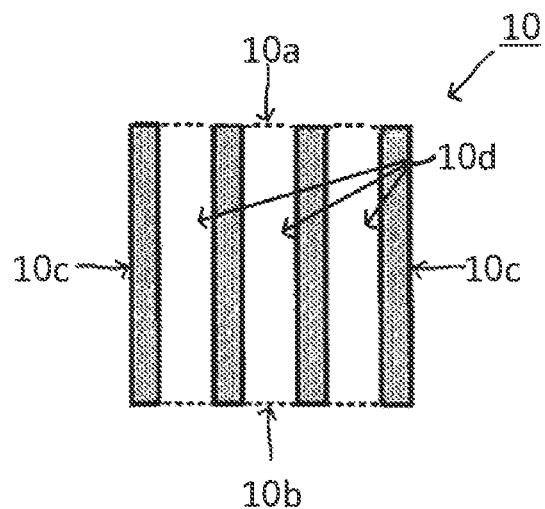
Figure 3A:
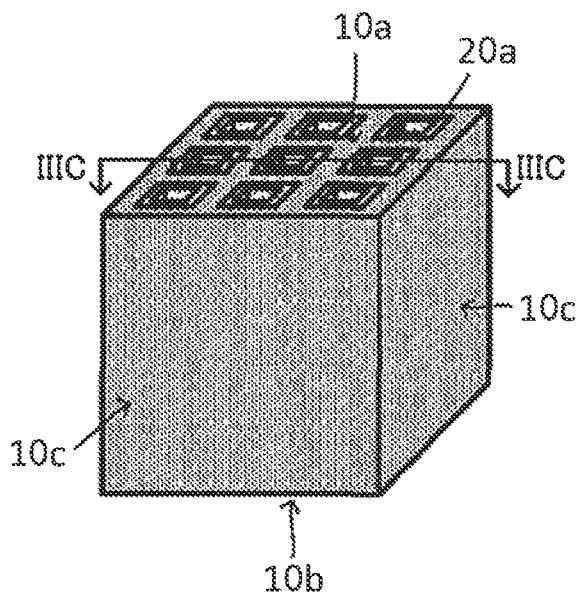
Figure 3B:
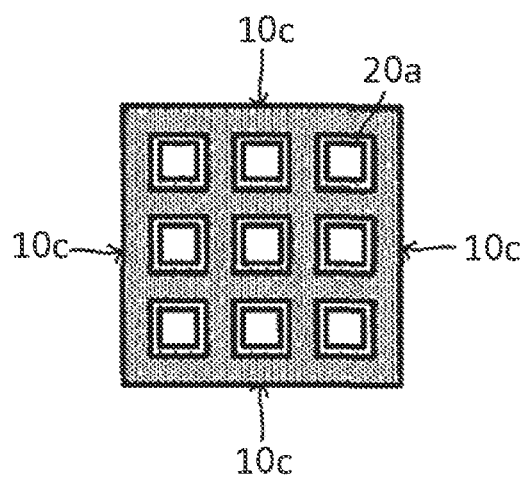
Figure 3C:
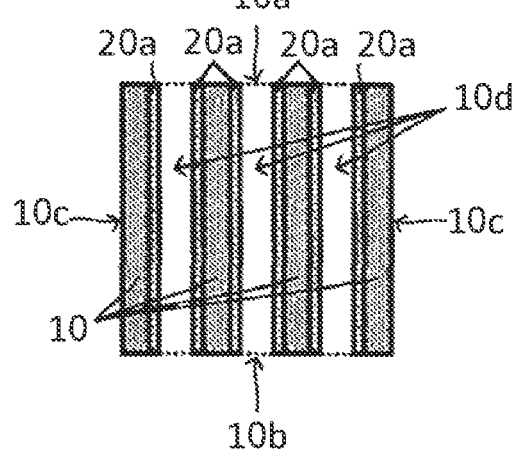
Figure 4A:
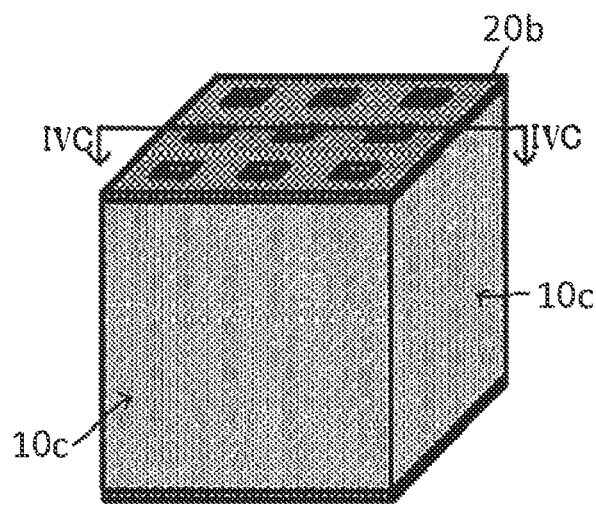
FIGS. 4A to 4C are explanatory schematic views of structure of a second separator layer 20b.
Figure 4B:
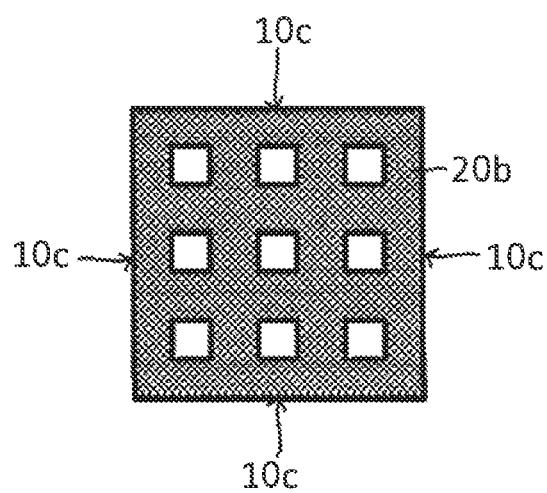
Figure 4C:
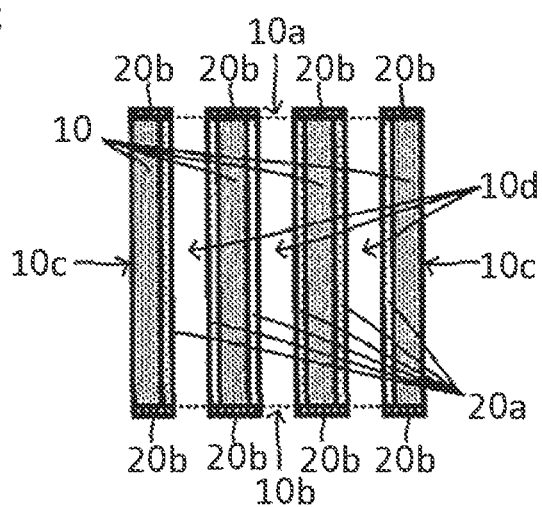
Figure 5A:
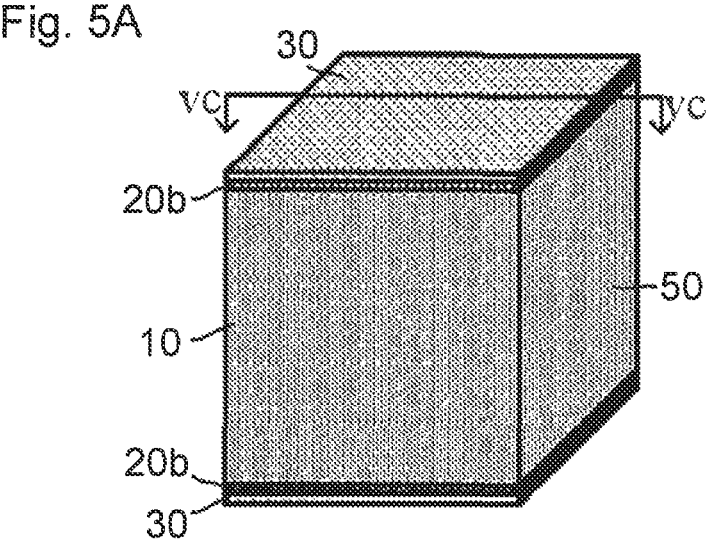
FIGS. 5A to 5C are explanatory schematic views of structure of a second electrode 30.
Figure 5B:
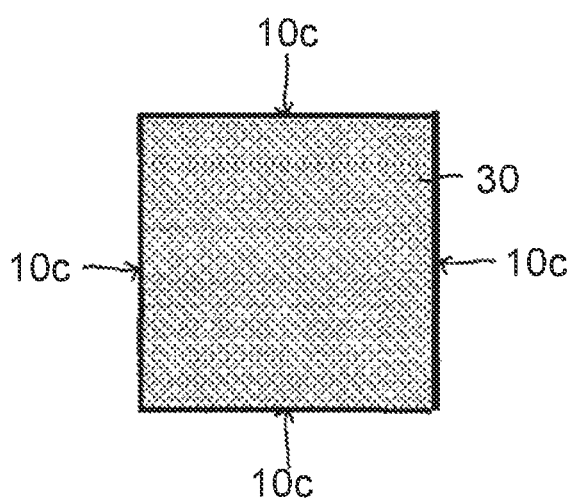
Figure 5C:
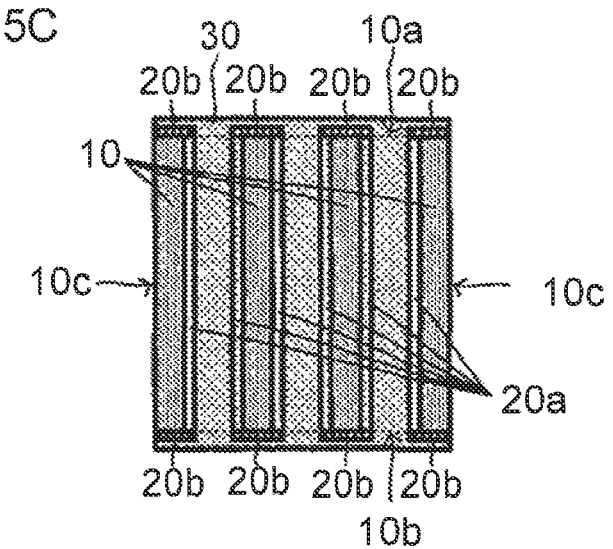

FIGS. 1A and 1B schematically show the structure of a secondary battery 100: FIG. 1A is a perspective view schematically showing the appearance of the secondary battery 100; and FIG. 1B schematically shows the structure on the cross section IB-IB of FIG. 1A. FIGS. 2A to 2C schematically show the structure of a first electrode 10 that is included in the secondary battery 100: FIG. 2A is a perspective view schematically showing the appearance of the first electrode 10; FIG. 2B is a top view schematically showing the shape of the first electrode 10 viewed on a one face 10a side; and FIG. 2C schematically shows the structure on the cross section IIC-IIC of FIG. 2A. FIGS. 3A to 3C schematically show the structure of a first separator layer 20a that is laminated to a surface of the first electrode 10: FIG. 3A is a perspective view schematically showing the appearance; FIG. 3B is a top view schematically showing the shape viewed on the one face 10a side; and FIG. 3C schematically shows the structure on the cross section IIIC-IIIC of FIG. 3A. FIGS. 4A to 4C schematically show the structure of a second separator layer 20b that is laminated to a surface of the first electrode 10: FIG. 4A is a perspective view schematically showing the appearance; FIG. 4B is a top view schematically showing the shape viewed on the one face 10a side; and FIG. 4C schematically shows the structure on the cross section IVC-IVC of FIG. 4A. Further, FIGS. 5A to 5C schematically show the structure of a second electrode 30 that is laminated to surfaces of the first separator layer 20a and the second separator layer 20b: FIG. 5A is a perspective view schematically showing the appearance; FIG. 5B is a top view schematically showing the shape viewed on the one face 10a side; and FIG. 5C schematically shows the structure on the cross section VC-VC of FIG. 5A.

As shown in FIGS. 1A to 5C, the secondary battery 100 includes: the first electrode 10 having the one face 10a, the opposite face 10b, the side face 10c, and a plurality of the through holes 10d that penetrate from the one face 10a to the opposite face 10b; the first separator layer 20a that is laminated to inner walls of the through holes 10d of the first electrode 10; the second separator layer 20b that is laminated to at least one of the one face 10a and the opposite face 10b of the first electrode 10; and the second electrode 30 that is laminated to surfaces of the first separator layer 20a and the second separator layer 20b, the surfaces being on the opposite side of other surfaces thereof which are in contact with the first electrode 10, the second electrode 30 being continuously present across the surfaces. Here, in the secondary battery 100, the conductivity of a carrier ion of the second separator layer 20b is lower than that of the first separator layer 20a.

1.1. First Electrode 10

As shown in FIGS. 2A to 2C, the first electrode 10 has the one face 10a, the opposite face 10b, the side face 10c, and a plurality of the through holes 10d that penetrate from the one face 10a to the opposite face 10b. The first electrode 10 has only to have strength of a certain level. The wall faces thereof may be dense, and may be porous.

1.1.1. One Face 10a and Opposite Face 10b

The shape of the one face 10a and the opposite face 10b of the first electrode 10 is not specifically limited. FIGS. 2A to 2C illustrate a quadrangular shape thereof, but the shape may be a polygon other than a quadrangle, a circle, or any other shape. The one face 10a and the opposite face 10b are not necessarily flat. The area of each of the one face 10a and the opposite face 10b, that is, the area of all over the face of each thereof including the area of the openings of a plurality of the through holes 10d is not specifically limited, and may be suitably determined according to the size and capacity, and performance of the battery to be aimed. For example, the area of each of the one face 10a and the opposite face 10b may be 50 mm$^2$ to 100000 mm$^2$.

1.1.2. Side Face 10c

The one face 10a of the first electrode 10 connects to the opposite face 10b thereof via the side face 10c. The side face 10c may be a flat face, may be a curved face, and may be a flat face and a curved face in combination. The length of the side face 10c of the first electrode 10 from the one face 10a to the opposite face 10b, that is, the height of the first electrode 10 is not specifically limited, and may be suitably determined according to the size and capacity, and performance of the battery to be aimed. For example, the height of the first electrode 10 may be 5 mm to 2000 mm.

1.1.3. Through Holes 10d

The first electrode 10 has the through holes 10d penetrating from the one face 10a to the opposite face 10b. FIGS. 2A to 2C illustrate the through holes 10d having a quadrangular cross-sectional shape of an opening shape, but the shape thereof may be a polygon other than a quadrangle, a circle, or any other shape. The cross-sectional area of the area of the openings of the through holes 10d is not specifically limited, and may be suitably determined according to the capacity and performance of the battery to be aimed. For example, the cross-sectional area by one through hole 10d may be 0.0001 mm$^2$ to 1 mm$^2$. A2/A1 may be 0.2 to 0.8 where A1 is the area of the one face 10a, and A2 is the total cross-sectional area of the through holes 10d. The width of each partition wall, or rib, that is, the rib thickness between the through holes 10d is not specifically limited, and may be suitably determined in view of strength etc. For example, the rib thickness may be 0.01 mm to 1 mm. The number of the through holes 10d provided for the first electrode 10 is not specifically limited. The density, the size, and the total number of the through holes 10d may be suitably determined in connection with the proportion of the capacity to the counter electrode. As shown in FIG. 2C, the through holes 10d may be provided for the first electrode 10 approximately linearly from the one face 10a to the opposite face 10b.

1.1.4. Material

The first electrode 10 contains a material that a carrier ion can be inserted into and extracted from in charge and discharge of a battery. When being an anode, the first electrode 10 can contain an anode active material. When being a cathode, the first electrode 10 can contain a cathode active material. Any material that stores and releases a predetermined carrier ion at a base potential, that is, whose charge-discharge potential is a base potential, can be used as an anode active material, and another material that stores and releases a predetermined carrier ion at a noble potential can be used as a cathode active material, among known active materials.

Any known anode active material of secondary batteries may be employed for the anode active material. When the secondary battery 100 is a lithium ion secondary battery, a carbon material such as graphite and hard carbon; Si or a Si alloy; any oxide such as lithium titanate; lithium metal or a lithium alloy; or the like may be used as the anode active material. One anode active material may be used alone, or two or more anode active materials may be used in combination. The anode active material may be in the form of a particle. When a particulate anode active material is employed, the primary particle size thereof may be 1 nm to 500 μm. The lower limit thereof may be at least 5 nm, may be at least 10 nm, and may be at least 50 nm. The upper limit thereof may be at most 100 μm, and may be at most 50 μm. Primary particles of the anode active material one another may aggregate to form a secondary particle. In this case, the secondary particle size is not specifically restricted, and for example, may be 0.5 μm to 1000 μm. The lower limit thereof may be at least 1 μm, and the upper limit thereof may be at most 500 μm.

Any known cathode active material of secondary batteries may be employed as the cathode active material. When the secondary battery 100 is a lithium ion secondary battery, the cathode active material can contain Li as a constituent element. Examples thereof include oxides and polyanions which contain Li. More specific examples thereof include lithium cobaltate such as $LiCoO_2$; lithium nickelate such as $LiNiO_2$; lithium manganate such as $LiMn_2O_4$; $LiNi_{1/3}Mn_{1/3}Co_{1/3}O_2$; different kind element substituent Li—Mn spinels represented by $Li_{1+x}Mn_{2-x-y}M_yO_4$ where M is at least one selected from Al, Mg, Co, Fe, Ni, and Zn; and lithium metal phosphates of $LiMPO_4$, where M is at least one selected from Fe, Mn, Co, and Ni. One cathode active material may be used alone, or two or more cathode active materials may be used in combination. The cathode active material may be in the form of a particle. When a particulate cathode active material is employed, the primary particle size thereof may be 1 nm to 500 μm. The lower limit thereof may be at least 5 nm, may be at least 10 nm, and may be at least 50 nm. The upper limit thereof may be at most 100 μm, and may be at most 50 μm. Primary particles of the cathode active material one another may aggregate to form a secondary particle. In this case, the secondary particle size is not specifically restricted, and for example, may be 0.5 μm to 1000 μm. The lower limit thereof may be at least 1 μm, and the upper limit thereof may be at most 500 μm.

The content of the active material in the first electrode 10 is not specifically limited, and may be suitably determined according to the performance of the battery to be aimed. For example, the content of the active material may be 60 mass % to 99 mass % when the total mass of the first electrode is defined as 100 mass %. The lower limit thereof may be at least 80 mass %, and the upper limit thereof may be at most 98 mass %.

When a particulate active material is employed for the first electrode 10, the first electrode 10 may contain this particulate active material, and a binder for binding the particulate active materials to one another. Examples of a binder that may be contained in the first electrode 10 include carboxymethyl cellulose (CMC), styrene-butadiene rubber (SBR), acrylonitrile-butadiene rubber (ABR), butadiene rubber (BR), polyvinylidene fluoride (PVDF), and polytetrafluoroethylene (PTFE). One binder may be used alone, or two or more binders may be used in combination. The content of the binder in the first electrode 10 is not specifically limited, and may be suitably determined according to the performance of the battery to be aimed. For example, the content of the binder may be 1 mass % to 40 mass % when the total mass of the first electrode is defined as 100 mass %. The lower limit thereof may be at least 2 mass %, and the upper limit thereof may be at most 20 mass %.

The first electrode 10 may contain a conductive additive, other than the active material and the binder. Examples of a conductive additive that may be contained in the first electrode 10 include carbon materials such as acetylene black (AB), ketjen black (KB), vapor grown carbon fibers (VGCF), carbon nanotubes (CNT), carbon nanofibers (CNF) and graphite; and metallic materials such as nickel, aluminum and stainless steel. One conductive additive may be used alone, or two or more conductive additives may be used in combination. Any shape like powder and fiber may be employed for the conductive additive. The content of the conductive additive in the first electrode 10 is not specifically limited, and may be suitably determined according to the performance of the battery to be aimed.

When the secondary battery 100 is an all-solid-state battery, the first electrode 10 may contain a solid electrolyte. A solid electrolyte that may be contained in the first electrode 10 may be either an organic solid electrolyte or an inorganic solid electrolyte. Examples of the inorganic solid electrolyte include sulfide solid electrolytes. When the secondary battery 100 is a lithium ion secondary battery, examples of a sulfide solid electrolyte include $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$. One solid electrolyte may be used alone, or two or more solid electrolytes may be used in combination. The content of the solid electrolyte in the first electrode 10 is not specifically limited, and may be suitably determined according to the performance of the battery to be aimed.

1.2. First Separator Layer 20a

As shown in FIGS. 3A to 3C, the first separator layer 20a is laminated to the inner walls of the through holes 10d in the first electrode 10. The first separator layer 20a prevents the first electrode 10 and the second electrode 30 from short-circuiting in the through holes 10d.

1.2.1. Shape

The first separator layer 20a shown in FIGS. 3A to 3C, which has a tubular form as a whole, covers substantially all over the face of the inner wall of each through hole 10d of the first electrode 10. The first separator layer 20a has only to have a thickness that can prevent the first electrode 10 and the second electrode 30 from short-circuiting, and can give necessary conductivity of a carrier ion. For example, the thickness of the first separator layer 20a may be 3 μm to 40 μm.

1.2.2. Material

Any known material suitable for separator layers of secondary batteries may be employed for the material of the first separator layer 20a. In view of coatability, film formability, etc. for the first electrode 10, the first separator layer 20a may contain a fine particle, and a binder to bind fine particles to one another. A fine particle, and a binder to bind fine particles to one another makes it possible to easily form a porous separator layer. In this case, any of inorganic fine particles of aluminum oxide, magnesium oxide, boehmite, etc., organic fine particles of polyethylene, polypropylene, etc., and mixed fine particles of inorganic and organic fine particles may be employed for the fine particle. The particle size of a fine particle that may be contained in the first separator layer 20a is not specifically limited. For example, the particle size thereof may be 1 nm to 500 μm. The lower limit thereof may be at least 5 nm, may be at least 10 nm, and may be at least 50 nm. The upper limit thereof may be at most 100 μm, and may be at most 50 μm. For example, at least one of the binders shown as the examples of the binder in the first electrode 10 may be employed for a binder that may be contained in the first separator layer 20a. The amounts of the fine particle and the binder in the first separator layer 20a are not specifically limited, and may be suitably determined in view of coatability, adhesion, etc. for the surface of the first electrode 10.

The first separator layer 20a has only to be able to secure conductivity of a carrier ion necessary for a secondary battery as described above. For example, when the secondary battery 100 includes an electrolyte solution containing a carrier ion, the first separator layer 20a can give necessary conductivity of a carrier ion as being impregnated with the electrolyte solution.

Or, a solid electrolyte layer may be employed for the first separator layer 20a. The solid electrolyte layer may contain a solid electrolyte, and optionally a binder. Any of the foregoing inorganic solid electrolytes may be employed for the solid electrolyte. Any of the foregoing binders may be employed for a binder that may be contained in the solid electrolyte layer. The content of each component in the solid electrolyte layer is not specifically limited, and may be suitably determined according to the performance of the battery to be aimed.

1.3. Second Separator Layer 20b

As shown in FIGS. 4A to 4C, the second separator layer 20b is laminated to at least one of the one face 10a and the opposite face 10b of the first electrode 10. FIGS. 4A to 4C show the embodiment of laminating the second separator layer 20b to each of the one face 10a and the opposite face 10b. The second separator layer 20b may be however laminated to only one of the one face 10a and the opposite face 10b. The second separator layer 20b prevents the first electrode 10 and the second electrode 30 from short-circuiting on the side(s) of the face(s) where the through holes 10d are open.

1.3.1. Shape

The second separator layer 20b shown in FIGS. 4A to 4C, which is in the form of a flat thin film as a whole, includes a plurality of holes present at positions corresponding to the through holes 10d. The second electrode 30 may be formed via these holes across the surface of the second separator layer 20b and the surface of the first separator layer 20a. The second separator layer 20b has only to have a thickness to the extent that the first electrode 10 and the second electrode 30 may be prevented from short-circuiting. For example, the thickness of the second separator layer 20b may be 3 μm to 40 μm.

1.3.2. Material

The second separator layer 20b has lower conductivity of a carrier ion than the first separator layer 20a. The second separator layer 20b may substantially not conduct a carrier ion. Any organic and inorganic material may be employed for a material satisfying such conditions. The second separator layer 20b may contain at least one selected from a polyimide, a polyamide-imide, and polyacrylic acid from the viewpoints that it is easy to lower conductivity of a carrier ion, and that it may be easy to form the second separator layer 20b by electrodeposition or transfer which will be described later.

1.4. Second Electrode 30

As shown in FIGS. 5A to 5C, the second electrode 30 is laminated to surfaces of the first separator layer 20a and the second separator layer 20b which are on the opposite side of surfaces thereof that are in contact with the first electrode 10, and is continuously present across the surface of the first separator layer 20a and the surface of the second separator layer 20b. This makes it possible for the second electrode 30 to stably collect currents on the side(s) of the one face 10a and/or the opposite face 10b of the first electrode 10.

1.4.1. Shape

The second electrode 30 is formed along the surfaces of the separator layers 20a and 20b. The second electrode 30 may fill the insides of the through holes 10d of the first electrode 10 either densely or in the form of a tube so that air holes remain in the middle (see FIG. 7). The fill rate and the thickness of the second electrode 30 inside the through holes 10d may be suitably determined in view of balanced capacity for the first electrode 10 etc. FIGS. 5A to 5C show the embodiment of laminating the second electrode 30 to all over the face of the second separator layer 20b on the side of the one face 10a or the opposite face 10b of the first electrode 10. The second separator layer 20b may be however partially exposed on the side of the one face 10a or the opposite face 10b of the first electrode 10.

1.4.2. Material

The second electrode 30 contains a material that a carrier ion may be inserted into and extracted from in charge and discharge of a battery. When the first electrode 10 is an anode, the second electrode 30 may be a cathode. When the first electrode 10 is a cathode, the second electrode 30 may be an anode. The foregoing description concerning the material constituting the first electrode 10 may be invoked for the material constituting the second electrode 30. That is, when being a cathode, the second electrode 30 can contain a cathode active material. When being an anode, the second electrode 30 can contain an anode active material. The type and amount of an active material that may be contained in the second electrode 30 are not specifically limited, and may be suitably determined according to the performance of the battery to be aimed. Like the first electrode 10, the second electrode 30 may contain other components such as a binder. For example, when a particulate active material is employed in the second electrode 30, the second electrode 30 may contain this particulate active material, and a binder for binding the particulate active materials to one another. The types and amounts of the other components are not specifically limited either, and may be suitably determined according to the performance of the battery to be aimed.

1.5. Other Components

The secondary battery 100 may include any component necessary as a battery, other than the first electrode 10, the first separator layer 20a, the second separator layer 20b, and the second electrode 30.

1.5.1. Current Collector

For example, the secondary battery 100 may include a first current collector 40 that is connected to the first electrode 10, and a second current collector 50 that is connected to the second electrode 30. In this case, as shown in FIGS. 1A and 1B, the first current collector 40 may be provided for the side face 10c of the first electrode 10, and the second current collector 50 may be provided for the surface of the second electrode 30 present on the side of the one face 10a or the opposite face 10b of the first electrode 10.

The current collectors may be constituted of, for example, metal foil, metal mesh, or the like. Examples of a metal constituting the current collectors include Cu, Ni, Co, Cr, Au, Pt, Al, Fe, Ti, Zn, and stainless steel. The thickness of each of the current collectors is not specifically limited, and may be, for example, 0.1 μm to 1 mm, and may be 1 μm to 100 μm.

1.5.2. Electrolyte Solution

As described above, the secondary battery 100 may include an electrolyte solution, and may be a solid battery not including an electrolyte solution. When the secondary battery 100 includes an electrolyte solution, the electrolyte solution may contain a carrier ion. Examples of the carrier ion include a lithium ion as described above. The problem to be solved by the technique of the present disclosure however arises not only in lithium ion secondary batteries but also in secondary batteries using any cation other than a lithium ion, such as sodium ion, potassium ion, and calcium ion, or anion such as a hydroxide ion and a fluoride ion, as a carrier ion. The technique of the present disclosure may be employed for every cation or anion battery as described above, where the same effect is expectable. The electrolyte solution may be an aqueous electrolyte solution, and may be a non-aqueous electrolyte solution. The composition of the electrolyte solution may be the same as any known composition of electrolyte solutions of secondary batteries.

1.5.3. Terminal, Battery Case

Needless to say, the secondary battery 100 may include necessary terminals, and may be housed in a battery case. Examples of the battery case include a known laminate pack.

2. Secondary Battery 200

Figure 6:
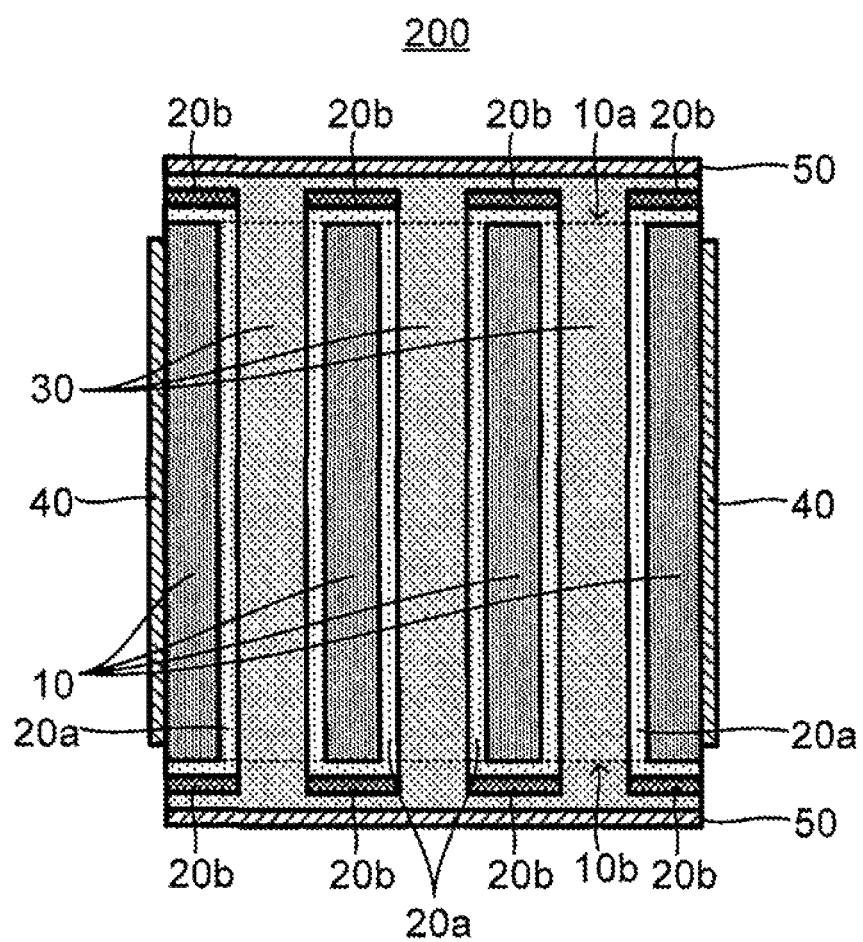
FIG. 6 is an explanatory schematic view of structure of a secondary battery 200.

The embodiment of including only one separator layer in a layer thickness direction has been described. The technique of the present disclosure is however not limitedly applied to this embodiment. A plurality of the first separator layers 20a may be included, and a plurality of the second separator layers 20b may be included. FIG. 6 schematically shows the structure on a cross section of a secondary battery 200. In FIG. 6, components same as those in FIGS. 1A to 5C are denoted by the same reference signs. As shown in FIG. 6, the secondary battery 200 is different from the secondary battery 100 because in the secondary battery 200, a plurality of the separator layers are laminated to the one face 10a and the opposite face 10b of the first electrode 10. Specifically, the first separator layers 20a are continuously laminated across the inner walls of the through holes 10d of the first electrode 10 and the one face 10a and/or the opposite face 10b of the first electrode 10, and the second separator layers 20b are laminated to the one face 10a and/or the opposite face 10b of the first electrode 10 via the first separator layer 20a. If the conductivity of a carrier ion of the second separator layers 20b, that is, the second separator layers of a multilayer structure which are laminated to the one face 10a and/or the opposite face 10b of the first electrode 10 as a whole is lower than that of the first separator layers 20a, that is, the first separator layers that are laminated to the inner walls of the through holes 10d in such an embodiment, a desired effect may be also given.

3. Secondary Battery 300

Figure 7:
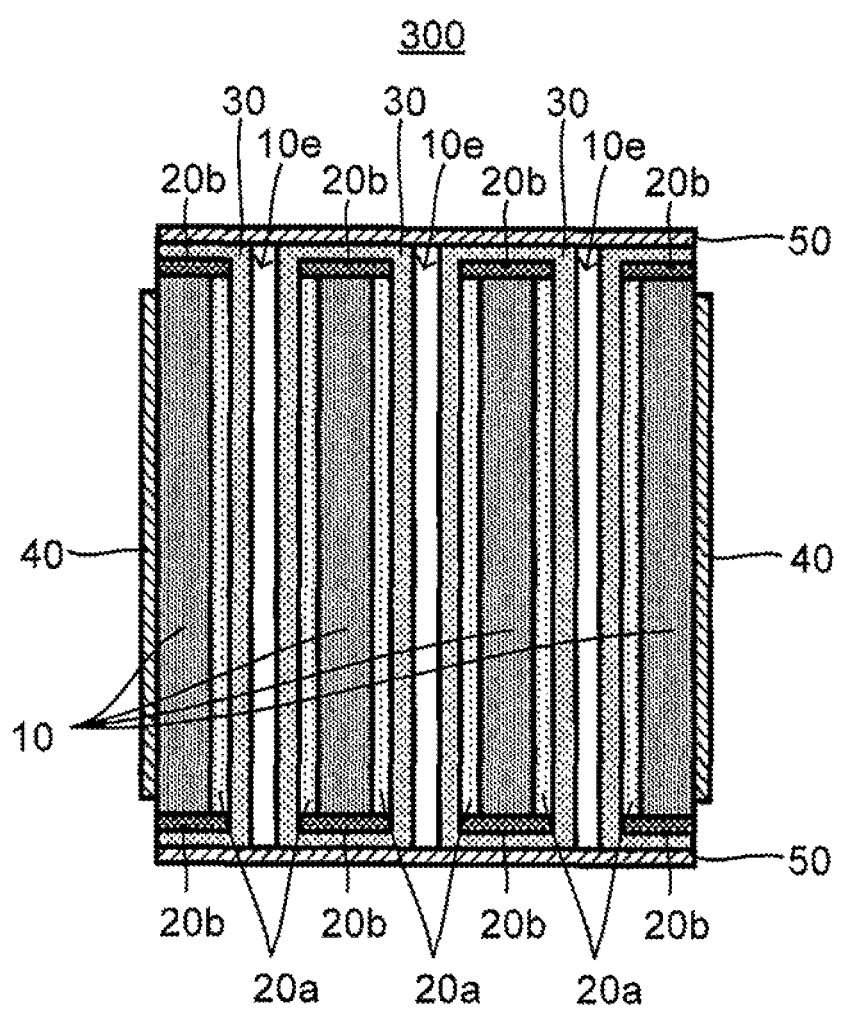
FIG. 7 is an explanatory schematic view of structure of a secondary battery 300.

The embodiment of completely filling the through holes 10d of the first electrode 10 with the first separator layer 20a and the second electrode 30 has been described. The technique of the present disclosure is not limitedly applied to this embodiment. FIG. 7 schematically shows the structure on a cross section of a secondary battery 300. In FIG. 7, components same as those in FIGS. 1A to 6 are denoted by the same reference signs. As shown in FIG. 7, the secondary battery 300 includes air holes 10e extending from the one face 10a to the opposite face 10b when the first separator layer 20a and the second electrode 30 are laminated to the inner walls of the through holes 10d of the first electrode 10. Even if such an air hole 10e is present in at least part of a secondary battery, the secondary battery can charge and discharge.

4. Method of Producing Secondary Battery S10

FIG. 8 shows the flow of the method of producing a secondary battery S10. As shown in FIG. 8, the method of producing a secondary battery S10 includes a first step S1 of making the first electrode 10 having the one face 10a, the opposite face 10b, the side face 10c, and a plurality of the through holes 10d that penetrate from the one face 10a to the opposite face 10b; a second step S2 of laminating the first separator layer 20a to the inner walls of the through holes 10d of the first electrode 10; a third step S3 of laminating the second separator layer 20b to at least one of the one face 10a and the opposite face 10b of the first electrode 10; and a fourth step S4 of continuously laminating the second electrode 30 to surfaces of the first separator layer 20a and the second separator layer 20b across the surfaces, the surfaces being on the opposite side of other surfaces thereof which are in contact with the first electrode 10. In the production method S10, in the third step S3, the conductivity of a carrier ion of the second separator layer 20b is lower than that of the first separator layer 20a. As described above, an electrolyte battery is employed as a secondary battery so that the conductivity of a carrier ion of the second separator layer 20b is lower than that of the first separator layer 20a as the separator layers are in contact with and are impregnated with an electrolyte solution.

4.1. First Step S1

For example, the first electrode 10 may be easily made by extrusion molding. Specifically, the active material, the binder etc. as described above, and a solvent are mixed to be a slurry or a paste, the slurry or the paste is extruded by means of a metallic mold, and thereafter the solvent is dried at a temperature such that the solvent can be removed, to obtain the first electrode 10. In this case, any of water, organic solvents, etc. may be used as the solvent according to the active material, the binder, etc. without any specific limitation.

Any method other than extrusion molding can be considered. For example, it is believed that the first electrode 10 can be obtained by dry compacting, and by sintering materials.

4.2. Second Step S2

The way of laminating the first separator layer 20a is not specifically limited. For example, a material to constitute the first separator layer 20a, and a solvent are mixed to be a slurry or a paste, and the inner walls of the through holes 10d are coated with the slurry or the paste to be dried, which makes it possible to laminate the first separator layer 20a to the inner walls of the through holes 10d. In this case, any of water, organic solvents, etc. may be used as the solvent according to the material without any specific limitation. For coating, one may put the slurry or the paste on the one face 10a side of the first electrode 10, and reduce pressure on the opposite face 10b side of the first electrode 10, to suck the slurry or the paste into the insides of the through holes 10d. The slurry or the paste may be extruded into the insides of the through holes 10d using a syringe or the like. Further, if an unnecessary layer is formed over the one face 10a and/or the opposite face 10b by, for example, the slurry or the paste overflowing onto the one face 10a and/or the opposite face 10b of the first electrode 10 in coating, such an unnecessary layer may be scraped away. The first separator layer 20a may be over the one face 10a and/or the opposite face 10b of the first electrode 10, like in the secondary battery 200.

Any method other than the foregoing can be considered. For example, a material to constitute the first separator layer 20a may be electro-deposited over the inner walls of the through holes 10d. In this case, uniformity of the thickness of the first separator layer 20a is believed to be easily secured.

4.3. Third Step S3

The way of laminating the second separator layer 20b is not specifically limited. For example, a material constituting the second separator layer 20b, and a solvent are mixed to be a slurry or a paste, and at least one of the one face 10a and the opposite face 10b of the first electrode 10 is coated with the slurry or the paste to be dried, which makes it possible to laminate the second separator layer 20b to at least one of the one face 10a and the opposite face 10b. In this case, any of water, solvents, etc. may be used as the solvent according to the material without any specific limitation.

Any method other than the foregoing can be considered. For example, a material to constitute the second separator layer 20b may be electro-deposited over at least one of the one face 10a and the opposite face 10b of the first electrode 10. In this case, uniformity of the thickness of the second separator layer 20b is believed to be easily secured. According to new findings of the inventor of the present disclosure, a separator layer is further uniformly formed easily at an edge portion of the first electrode 10 when electro-deposited for the first electrode 10. That is, advantage from electrodeposition is more outstanding in the third step S3 of laminating the second separator layer 20b than in the second step S2 of laminating the first separator layer 20a.

Or, a material to constitute the second separator layer 20b may be transferred to at least one of the one face 10a and the opposite face 10b of the first electrode 10. For example, a material to constitute the second separator layer 20b is laminated to a base material to be stuck to the one face 10a and/or the opposite face 10b of the first electrode 10, and thereafter the base material is removed, which makes it possible to transfer the material to constitute the second separator layer 20b to the one face 10a and/or the opposite face 10b of the first electrode 10. Uniformity of the thickness of the second separator layer 20b is easily secured as well when the second separator layer 20b is formed by such a transfer method.

4.4. Fourth Step S4

The way of laminating the second electrode 30 is not specifically limited. For example, a material to constitute the second electrode 30, and a solvent are mixed to be a slurry or a paste, and the surfaces of the first separator layer 20a and the second separator layer 20b are coated with the slurry or the paste to be dried, which makes it possible to continuously laminate the second electrode 30 across the surface of the first separator layer 20a and the surface of the second separator layer 20b. In this case, any of water, organic solvents, etc. may be used as the solvent according to the material without any specific limitation. For coating, one may put the slurry or the paste over the surface of the second separator layer 20b, which is on the one face 10a side of the first electrode 10, and reduce pressure on the opposite face 10b side of the first electrode 10, to suck the slurry or the paste from the surface of the second separator layer 20b onto the surface of the first separator layer 20a inside the through holes 10d. The slurry or the paste may be extruded into the insides of the through holes 10d using a syringe or the like.

4.5. Other Steps

The production method S10 may include a step of attaching a current collector, a step of attaching a terminal, a step of hosing into a battery case, a step of impregnating with an electrolyte solution, etc., in addition to the steps S1 to S4.

5. Effect

Figure 9A:
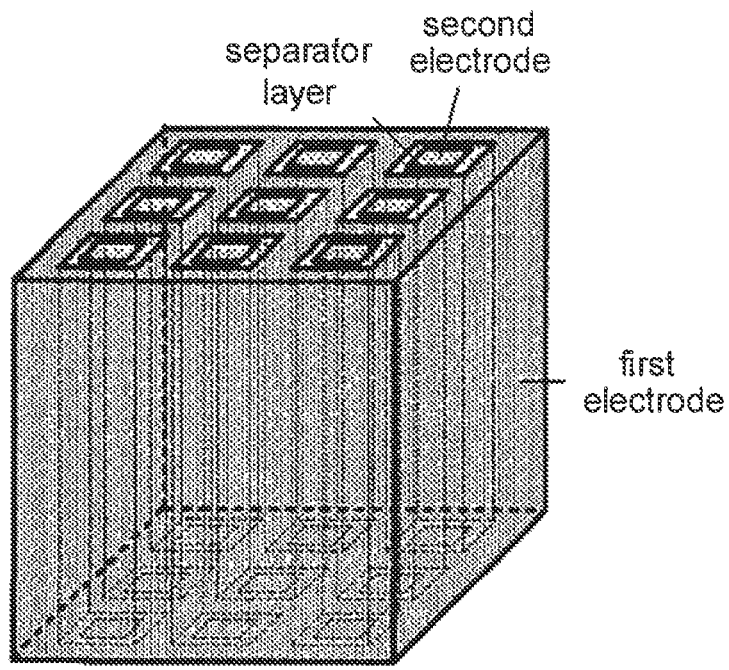
FIGS. 9A and 9B are explanatory schematic views of structure of a secondary battery the inventor of the present application conceived.

In a secondary battery, it is ideal that a cathode and an anode face each other so that the proportion of the capacity of the cathode is the same as that of the anode everywhere in the battery. Here, when the structure as shown in FIG. 9A is employed for a secondary battery, it is easy to form "a portion where the second electrode faces the first electrode as having the same proportion of the capacity as the first electrode" inside the battery, or inside the through holes. For example, as shown in FIG. 10A, the first electrode in a region A and the second electrode in a region B can face each other as having the same proportion of the capacity.

Figure 9B:
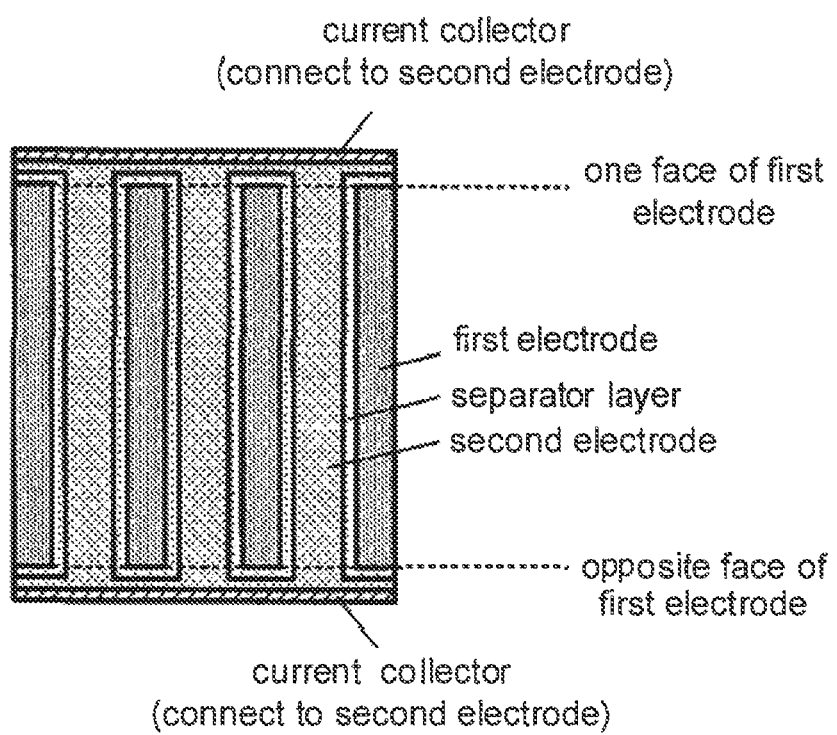
Figure 10A:
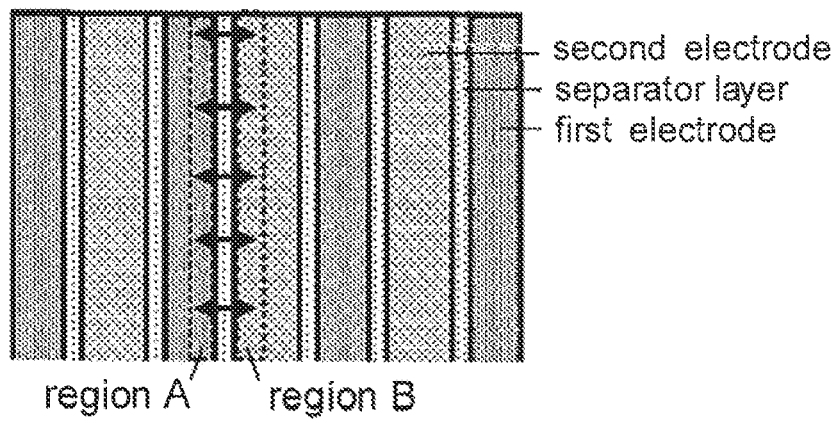
FIGS. 10A to 10C are explanatory schematic views showing how the problem arises, and technical effect of the present disclosure.

The structure shown in FIGS. 9A and 10A however causes a problem of difficulty in stable current collection for the second electrode. To solve the problem, for example, as shown in FIGS. 9B and 10B, the separator layer and the second electrode may extend to the one face side and/or the opposite face side of the first electrode.

Figure 10B:
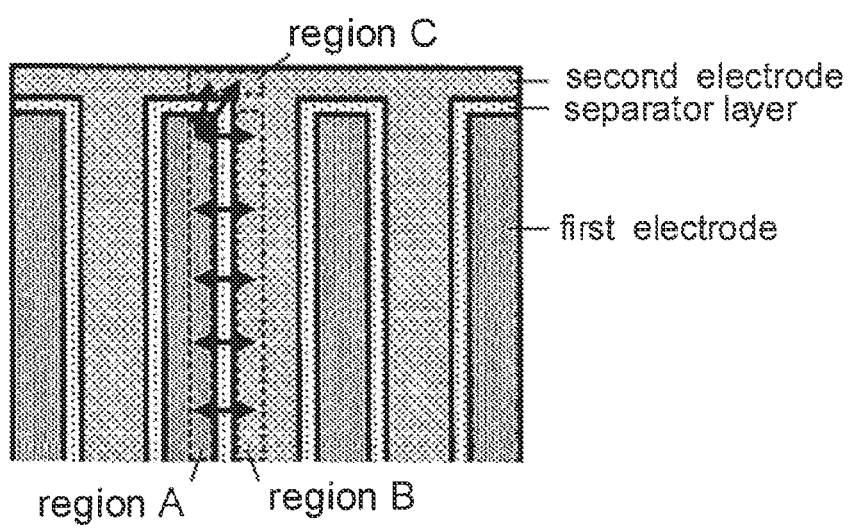

However, when the second electrode is also present in a region C that is on the one face side of the first electrode as shown in FIG. 10B, battery reaction may progress between the second electrode and the first electrode in the region C, which leads to locally and easily unbalanced capacity in the vicinity of the one face of the first electrode. Locally unbalanced capacity concentrates battery reaction in that local part, which may encourage deposition of a metal such as lithium or side reaction. As a result, cycle characteristics of the battery may deteriorate.

Figure 10C:
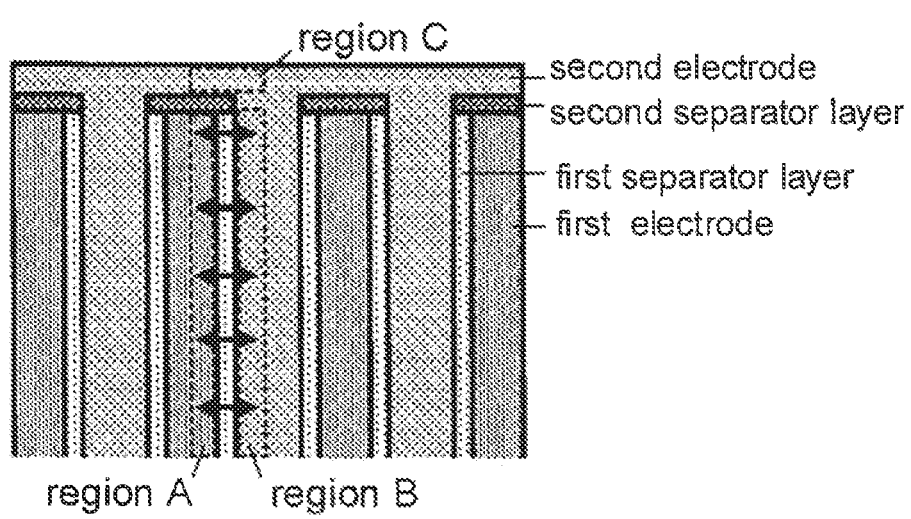

In contrast, as shown in FIG. 10C, in the secondary battery of the present disclosure, the first separator layer having high conductivity of a carrier ion is provided for the inner walls of the through holes of the first electrode on one hand, and the second separator layer having low conductivity of a carrier ion is provided on the one face side or the opposite face side of the first electrode on the other hand, which makes it difficult for the second electrode in the region C to contribute to battery reaction. As a result, the capacity of the first electrode is hard to unbalance that of the second electrode, and deterioration of cycle characteristics may be suppressed.

EXAMPLES

1. Example 1

1.1. Making First Electrode

An anode slurry was made by mixing 45 parts by mass of a natural graphite fine particle having an average particle size (D50) of 15 μm, 10 parts by mass of carboxymethyl cellulose, and 45 parts by mass of an ion-exchanged water. The anode slurry was subjected to extrusion molding through a metallic mold, and thereafter dried at 120° C. for 3 hours, to obtain a first electrode. The first electrode had a columnar shape having a diameter of 20 cm and a height of 1 cm. In the face of the circle of 20 cm in diameter, 250 μm square holes were arranged at regular intervals via ribs, or partition walls each having a thickness of 150 μm.

1.2. Laminating First Separator Layer

A paste for a separator was made by mixing 45 parts by mass of a boehmite fine particle having an average particle size (D50) of 100 nm, 4 parts by mass of PVDF, and 51 parts by mass of an ion-exchanged water. On one face of the first electrode, 3 to 5 g of the paste for a separator was put. The put paste was sucked by a vacuum pump on the opposite face side to let the paste flow inside the through holes, to attach the paste to almost all over the faces of the inner walls of the through holes. Thereafter, the paste was dried at 120° C. for 15 minutes to adhere the first separator layer to the inner walls of the through holes, to obtain a structure A as shown in FIGS. 3A to 3C.

1.3. Laminating Second Separator Layer

The structure A was put into a polyimide solution for electrodeposition, here, Elecoat manufactured by SHIMIZU CO., LTD., where a polyimide having a particle size of approximately 50 μm dispersed. At this time, a Ni tab was wound around the side face of the first electrode in advance, so that voltage could be applied to the first electrode in electrodeposition. Next, a voltage of 30 V was applied for 2 minutes under such a condition that the first electrode was used as an anode, and the working electrode was used as a cathode, to electro-deposit a second separator layer containing a polyimide over the one face and opposite face of the first electrode. After the electrodeposition, the residue of the electrodeposition solution was removed by washing by water, heating was carried out at 150° C. for 1 hour, and a structure B was obtained as shown in FIGS. 4A to 4C.

1.4. Laminating Second Electrode

A cathode paste was made by mixing 64 parts by mass of a lithium cobaltate fine particle having a particle size of approximately 10 μm, 4 parts by mass of acetylene black, 2 parts by mass of PVDF, and 30 parts by mass of NMP. Next, the structure B was fixed inside a plastic syringe, 3.5 g of the cathode paste was put into the syringe, and the cathode paste was injected into the through holes of the first electrode by pressure by the syringe. The syringe was stopped from being pushed at the stage where it was visually observed that the cathode paste came out from an opening on the opposite side of the injection side, the electrodes were taken out from the syringe and dried at 120° C. for 30 minutes, to obtain a structure C as shown in FIGS. 5A to 5C.

1.5. Assembling Battery

Aluminum foil, that is, a second current collector having a diameter of 25 mm and a thickness of 15 μm was bonded over the surface of the second electrode, which was present on the one face and the opposite face of the structure C, via 0.5 g of the cathode paste, to be dried at 120° C. for 15 minutes. Next, nickel wire, that is, a first current collector having a thickness of 50 μm and a width of 3 mm was wound once around the side face of the first electrode of the structure C, and fixed by electric resistance welding. SUS tabs were welded to the first current collector and the second current collector respectively, and thereafter the battery was housed in a laminate pack. Into the laminate pack, 5 g of an electrolyte solution of EC:EMC:DMC=1:1:1 and $LiPF_6$ of 1 mol/kg was put, and the laminate pack was vacuum-sealed so that only the tips of the SUS tabs were out of the pack, to obtain a laminate-type secondary battery for evaluation.

1.6. Evaluation Method 1.6.1. Short-circuit Test

The resistance between both electrodes of the battery before injection of the electrolyte solution was measured by a tester. A resistance of at least 1 MΩ was evaluated as "pass", that is, not short-circuit, and a resistance lower than 1 MΩ was evaluated as "failure", that is, short-circuited. The evaluation results are shown in the following Table 1.

1.6.2. Charge/Discharge Cycle Test

Unbalanced capacities of the cathode and the anode near the face where the through holes are open, and unbalanced capacities of the cathode and the anode inside the through holes make charge and discharge in the whole of the battery ununiform, which makes it easy for deterioration of the capacity due to lithium deposition, and excess film formation to progress. The charge/discharge cycle test was carried out under the following conditions in order to check the effect of suppressing the foregoing by the second separator layer, to measure the capacity retention, that is, the discharge capacity after 50 cycles/initial discharge capacity. The evaluation results are shown in the following Table 1.

charge: CC at 4.2V, CV cut at 10 mA, current rate: 200 mA, that is, equivalent to 0.5 C discharge: CC at 3V, CV cut at 10 mA, current rate: 200 mA rest time between charge and discharge: 10 minutes 2. Example 2

A secondary battery was made and evaluated in the same manner as in Example 1 except that a polyamide film was formed by the following transfer method when the second separator layer was laminated. The evaluation results are shown in the following Table 1.

A 10% polyamide-imide-dissolved NMP solution was applied onto aluminum foil by a bar coater. The applied film was stuck to the one face and the opposite face of the first electrode before dried, and the aluminum foil was removed. Thereafter, the first electrode was calcined in an argon atmosphere at 230° C. for 1 hour, to form the polyamide film over the one face and the opposite face of the first electrode. The thickness of the polyamide film was adjusted by a gap of a bar coater, so as to finally be 15 μm.

3. Example 3

A secondary battery was made and evaluated in the same manner as in Example 2 except that a transfer liquid was a 7% polyacrylic acid-dissolved water solution, and the calcining temperature was 150° C. The evaluation results are shown in the following Table 1.

4. Example 4

A secondary battery was made and evaluated in the same manner as in Example 1 except that the electrodeposition time was 25 seconds when the second separator layer was laminated. The evaluation results are shown in the following Table 1.

5. Example 5

A secondary battery was made and evaluated in the same manner as in Example 1 except that the electrodeposition voltage was 60 V when the second separator layer was laminated. The evaluation results are shown in the following Table 1.

6. Example 6

A secondary battery was made and evaluated in the same manner as in Example 1 except that a polyethylene fine particle having a particle size of 15 μm was used instead of the boehmite particle when the first separator layer was laminated. The evaluation results are shown in the following Table 1.

7. Comparative Example 1

A secondary battery was made and evaluated in the same manner as in Example 1 except that no second separator layer was provided. The evaluation results are shown in the following Table 1.

8. Comparative Example 2

A secondary battery was made and evaluated in the same manner as in Example 2 except that a transfer liquid was the dispersion of a boehmite fine particle employed in Example 1 when the second separator layer was laminated. The evaluation results are shown in the following Table 1.

9. Comparative Example 3

A secondary battery was made and evaluated in the same manner as in Example 1 except that the way same as in the formation of the second separator layer in Example 1 was employed: specifically, the first electrode to which the first separator layer was not laminated was put into the electrodeposition solution, to be subjected to electrodeposition under the same conditions as in Example 1. The evaluation results are shown in the following Table 1.

TABLE 1

| | first separator layer | | second separator layer | | | | |
| --- | --- | --- | --- | --- | --- | --- | --- |
| | composition | conductivity of lithium ion | composition | film thickness μm | conductivity of lithium ion | Short-circuit test | capacity retention % |
| Ex. 1 | boehmite fine particle film | high | polyimide film | 15 | low | pass | 91 |
| Ex. 2 | boehmite fine particle film | high | polyamide-imide film | 15 | low | pass | 92 |
| Ex. 3 | boehmite fine particle film | high | polyacrylic acid film | 15 | low | pass | 94 |
| Ex. 4 | boehmite fine particle film | high | polyimide film | 5 | low | pass | 90 |
| Ex. 5 | boehmite fine particle film | high | polyimide film | 25 | low | pass | 91 |
| Ex. 6 | polyethylene fine particle film | high | polyimide film | 15 | low | pass | 92 |
| Comp. Ex. 1 | boehmite fine particle film | high | none | — | — | failure | excluded |
| Comp. Ex. 2 | boehmite fine particle film | high | boehmite fine particle film | 15 | high | pass | 67 |
| Comp. Ex. 3 | polyimide film | low | polyimide film | 15 | low | pass | impossible to charge/discharge |

It was found from the comparison of Examples 1 to 6 and Comparative Example 1 that no second separator layer led to short circuits. It was also found from the comparison of Examples 1 to 6 and Comparative Example 2 that when both the first separator layer and the second separator layer had high conductivity of a lithium ion, cycle characteristics significantly deteriorated. Further, in Comparative Example 3, the first separator layer having low conductivity of a lithium ion resulted in almost no current flowing at the time point of the initial charging, which made it impossible to function as a secondary battery.

10. Supplement

The foregoing Examples showed a first separator layer of a specific composition, and a second separator layer of a specific composition. In the technique of the present disclosure, the composition of the separator layer is not limited to any of the foregoing compositions. A desired effect is believed to be given when the second separator layer has lower conductivity of a carrier ion as a result of comparison of the first separator layer and the second separator layer (FIG. 10C).

The foregoing Examples showed the embodiment of the first electrode as an anode and the second electrode as a cathode. The technique of the present disclosure is not limitedly applied to this embodiment. The first electrode may be a cathode, and the second electrode may be an anode.

In the foregoing Examples, a lithium ion was employed for a carrier ion in the secondary battery. The technique of the present disclosure can be applied to every cation secondary battery other than the lithium ion secondary battery, or every anion secondary battery.

INDUSTRIAL APPLICABILITY

The secondary battery of the present disclosure may be preferably used as, for example, a large-sized automobile power source.

REFERENCE SIGNS LIST 10 first electrode
20a first separator layer
20b second separator layer
30 second electrode
40 first current collector
50 second current collector
100, 200, 300 secondary battery

What is claimed is:
1. A secondary battery comprising:
 a first electrode having one face, an opposite face, a side face, and a plurality of through holes that penetrate from the one face to the opposite face;
 a first separator layer that is laminated to inner walls of the through holes of the first electrode;
 a second separator layer that is directly laminated to at least one of the one face and the opposite face of the first electrode; and
 a second electrode that is laminated to a surface of the second separator layer, the surface being on an opposite side of another surface thereof which is in contact with the first electrode, the second electrode being continu- ously present across a surface of the first separator layer and the surface of the second separator layer, wherein conductivity of a carrier ion of the second separator layer is lower than conductivity of the carrier ion of the first separator layer.

2. The secondary battery according to claim 1, wherein the first separator layer contains a fine particle, and a binder to bind the fine particles, wherein the fine particle is limited to a particle size of 1 nm to 500 μm.

3. The secondary battery according to claim 1, wherein the second separator layer contains at least one selected from a polyimide, a polyamide-imide, and polyacrylic acid.

4. The secondary battery according to claim 1, wherein the carrier ion of the first separator layer and the carrier ion of the second separator layer is a lithium ion.

5. The secondary battery according to claim 1, further comprising: an electrolyte solution containing another carrier ion.

6. The secondary battery according to claim 1, further comprising:
 a first current collector that is provided for the side face of the first electrode; and
 a second current collector that is provided for a surface of the second electrode present on a side of the one face or the opposite face of the first electrode.

7. A method of producing a secondary battery, the method comprising:
 a first step of making a first electrode having one face, an opposite face, a side face, and a plurality of through holes that penetrate from the one face to the opposite face;
 a second step of laminating a first separator layer to inner walls of the through holes of the first electrode;
 a third step of laminating a second separator layer directly to at least one of the one face and the opposite face of the first electrode; and
 a fourth step of continuously laminating a second electrode to a surface of the the second separator layer across the surface of the second separator and a surface of the first separator layer, the surface of the second separator layer being on an opposite side of another surface thereof which is in contact with the first electrode,
wherein in the third step, conductivity of a carrier ion of the second separator layer is lower than conductivity of the carrier ion of the first separator layer.

8. The method according to claim 7, wherein
in the third step, a material to constitute the second separator layer is electro-deposited over, or transferred to at least one of the one face and the opposite face of the first electrode.

* * * * *